(12) United States Patent
Yang et al.

(10) Patent No.: US 10,102,975 B2
(45) Date of Patent: Oct. 16, 2018

(54) FILM CAPACITOR

(71) Applicant: BYD COMPANY LIMITED, Shenzhen, Guangdong (CN)

(72) Inventors: Wei Yang, Shenzhen (CN); Siyuan Liu, Shenzhen (CN); Lusheng Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/603,171

(22) Filed: May 23, 2017

(65) Prior Publication Data

US 2017/0256358 A1 Sep. 7, 2017

Related U.S. Application Data

(63) Continuation of application No. PCT/CN2015/095339, filed on Nov. 23, 2015.

(30) Foreign Application Priority Data

Nov. 28, 2014 (CN) .......................... 2014 1 0709201

(51) Int. Cl.
*H01G 2/04* (2006.01)
*H01G 4/228* (2006.01)
(Continued)

(52) U.S. Cl.
CPC .............. *H01G 4/236* (2013.01); *H01G 4/224* (2013.01); *H01G 4/33* (2013.01); *H01G 4/38* (2013.01)

(58) Field of Classification Search
CPC .............. H01G 4/38; H01G 4/228; H01G 2/04
(Continued)

(56) References Cited

U.S. PATENT DOCUMENTS

| 7,092,238 B2 | 8/2006 | Saito et al. |
| 8,018,712 B2 * | 9/2011 | Yang ...................... H02G 5/005 361/328 |

(Continued)

FOREIGN PATENT DOCUMENTS

| CN | 1714415 | 12/2005 |
| CN | 202384178 U | 8/2012 |

(Continued)

OTHER PUBLICATIONS

International Search Report and Written Opinion for Application No. PCT/CN2015/095339, dated Jan. 29, 2016, 6 pages.

*Primary Examiner* — Eric Thomas

(57) ABSTRACT

The present disclosure provides a film capacitor, including: a plurality of capacitor cores, including: a first group of capacitor cores connected in parallel, having first and second end surfaces; and a second group of capacitor cores connected in parallel, connected with the first group of capacitor cores in series, having a third end surface opposite to the first end surface of the first group of capacitor cores and a fourth end surface; a positive electrode busbar, connected to the first end surface; a negative electrode busbar, connected to the third end surface; an intermediate busbar, connected to the second end surface and the fourth end surface respectively; a first connection sheet connected to the positive electrode busbar; a second connection sheet connected to the negative electrode busbar; and a third connection sheet connected to the intermediate busbar.

18 Claims, 2 Drawing Sheets

(51) Int. Cl.
    *H01G 4/38*       (2006.01)
    *H01G 4/236*    (2006.01)
    *H01G 4/33*       (2006.01)
    *H01G 4/224*    (2006.01)

(58) Field of Classification Search
    USPC .................................................. 361/328–329
    See application file for complete search history.

(56) References Cited

U.S. PATENT DOCUMENTS

| | | | |
|---|---|---|---|
| 8,315,031 B2* | 11/2012 | Kyouda | H01G 2/106 |
| | | | 361/301.3 |
| 2010/0000089 A1* | 1/2010 | Yang | H01G 2/04 |
| | | | 29/854 |
| 2011/0149472 A1* | 6/2011 | Yang | H01G 4/228 |
| | | | 361/330 |
| 2013/0335881 A1* | 12/2013 | Atsumi | H01G 11/74 |
| | | | 361/303 |
| 2015/0340157 A1 | 11/2015 | Wen et al. | |
| 2017/0133154 A1* | 5/2017 | Sasaki | H01G 4/228 |

FOREIGN PATENT DOCUMENTS

| | | | |
|---|---|---|---|
| CN | 103986309 A | | 8/2014 |
| JP | 2003133172 A | * | 5/2003 |
| JP | 2013-229962 A | | 11/2013 |
| JP | 2014216453 A | * | 11/2014 |

\* cited by examiner

FILM CAPACITOR

CROSS-REFERENCE TO RELATED APPLICATIONS

This application is a continuation application of International Application No. PCT/CN2015/095339, filed on Nov. 23, 2015, which is based on and claims priority to and benefits of Chinese Patent Application No. 201410709201.9, filed with the State Intellectual Property Office (SIPO) of the People's Republic of China on Nov. 28, 2014. The entire contents of the above-identified application are incorporated herein by reference.

FIELD

The present disclosure relates to a capacitor, and more particularly relates to a film capacitor.

BACKGROUND

The film capacitor such as a metalized film capacitor has characteristics like a low loss, a high voltage resistance, a good temperature characteristic and a good frequency characteristic.

The metalized film capacitor in the related art usually can only be provided separately and has a very low capacity, or a plurality of the metalized film capacitors are connected together via a complicated structure, which results in a problem of inconvenience.

SUMMARY

The present disclosure aims to solve at least one of the above problems.

Accordingly, embodiments of the present disclosure provide a film capacitor, which has a simplified structure and is easy to be assembled.

The film capacitor according to embodiments of the present disclosure includes: a plurality of capacitor cores, including: a first group of capacitor cores connected in parallel, having a first end surface and a second end surface; and a second group of capacitor cores connected in parallel, connected with the first group of capacitor cores in series, having a third end surface opposite to the first end surface of the first group of capacitor cores and a fourth end surface; a positive electrode busbar, connected to the first end surface of the first group of capacitor cores; a negative electrode busbar, connected to the third end surface of the second group of capacitor cores; an intermediate busbar, connected to the second end surface of the first group of capacitor cores and the fourth end surface of the second group of capacitor cores respectively; a first connection sheet connected to the positive electrode busbar; a second connection sheet connected to the negative electrode busbar; and a third connection sheet connected to the intermediate busbar.

In some embodiments, the film capacitor further includes a first electrode terminal connected to the positive electrode busbar, a second electrode terminal connected to the negative electrode busbar, and a third electrode terminal connected to the intermediate busbar.

In some embodiments, the intermediate busbar is provided with a plurality of relief holes configured to expose the first electrode terminal and the second electrode terminal therefrom.

In some embodiments, the film capacitor further includes a casing, in which the plurality of capacitor cores, the positive electrode busbar, the negative electrode busbar, the intermediate busbar, the first connection sheet, the second connection sheet and the third connection sheet are disposed within the casing and sealed by potting insulators.

In some embodiments, the film capacitor further includes an insulation sheet located between the positive electrode busbar and the negative electrode busbar.

In some embodiments, the intermediate busbar is of a substantially inverted U shape, including two free ends, each provided with and integrally formed with the third connection sheet; and a top portion, covering above an upper surface of the plurality of capacitor cores.

In some embodiments, each group of capacitor cores is arranged in a plurality of rows and no less than one layer.

In some embodiments, each group of capacitor cores is arranged in the plurality of rows and two layers.

In some embodiments, the first connection sheet is provided with a first connection terminal at a peripheral edge thereof, the second connection sheet is provided with a second connection terminal at a peripheral edge thereof, and the third connection sheet is provided with a third connection terminal at a peripheral edge thereof.

In some embodiments, the first connection terminal and the first connection sheet are integrally formed, the second connection terminal and the second connection sheet are integrally formed, and the third connection terminal and the third connection sheet are integrally formed.

In some embodiments, the first connection sheet and the positive electrode busbar are integrally formed, the second connection sheet and the negative electrode busbar are integrally formed, and the third connection sheet and the intermediate busbar are integrally formed.

The film capacitor according to embodiments of the present disclosure, is a three-level film capacitor. By providing a structure in which the plurality of capacitor cores are divided into two groups, the capacitor cores in each group are connected in parallel via the positive electrode busbar or the negative electrode busbar respectively, and the two groups are connected in series with each other through the intermediate busbar and the third connection sheet, the structure of the film capacitor may be simplified, and the assembling of the film capacitor may be convenient. Moreover, the groups of capacitor cores may be easily connected together in series, and the whole capacity of the film capacitor may be improved. The above mentioned structure is suitable for the three-level capacitor and has a wide application.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

Figure 1:
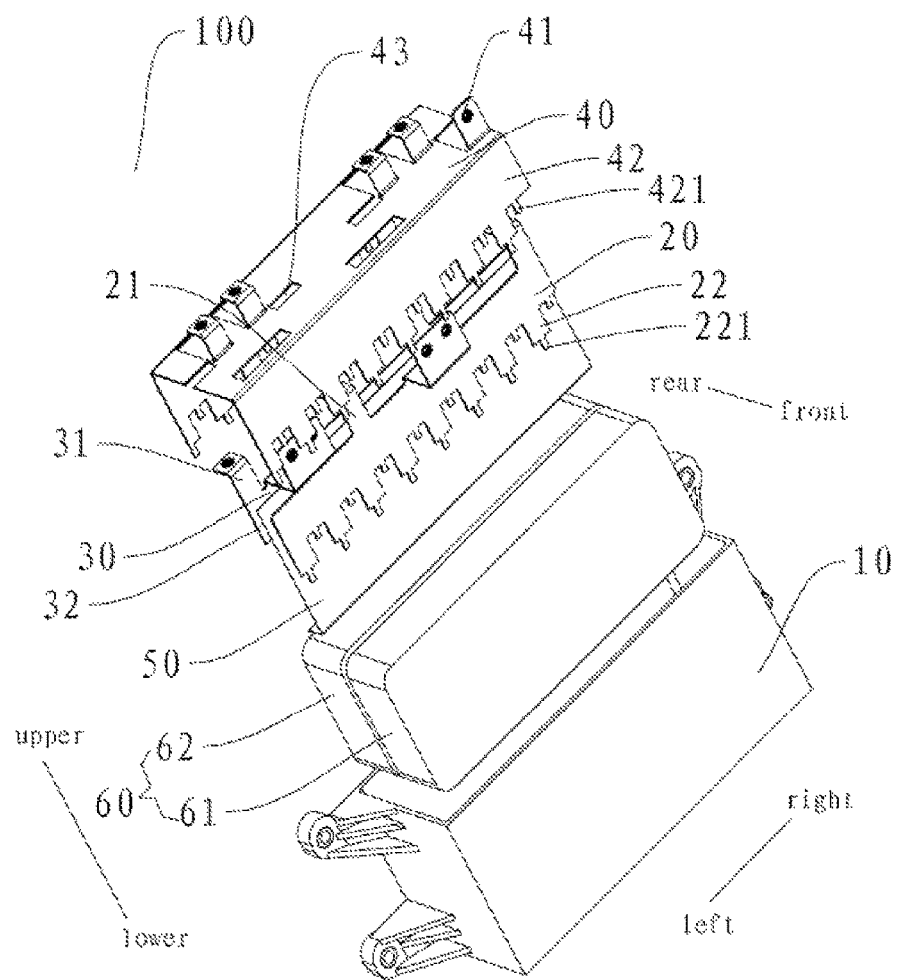
FIG. 1 is an exploded view of a film capacitor according to an embodiment of the present disclosure.

REFERENCE NUMERALS film capacitor 100;
casing 10;

positive electrode busbar 20; first electrode terminal 21; first connection sheet 22; first connection terminal 221;

negative electrode busbar 30; second electrode terminal 31; second connection sheet 32;

intermediate busbar 40; third electrode terminal 41; third connection sheet 42; third connection terminal 421; relief hole 43;

insulation sheet 50;

capacitor core 60; first group of capacitor cores 61; second group of capacitor cores 62.

DETAILED DESCRIPTION

Reference will be made in detail to embodiments of the present disclosure, where the same or similar elements and the elements having the same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "length," "width," "thickness," "upper," "lower," "front," "rear," "left," "right," "vertical," "horizontal," "top," "bottom," "inner," and "outer" should be construed to refer to the orientation as then described or as shown in the drawings under discussion. These relative terms are for convenience of description and do not require that the present disclosure be constructed or operated in a particular orientation, thus shall not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means at least two, e.g. two, three and so on, unless specified otherwise.

In the description of the present disclosure, it should be understood that, unless specified or limited otherwise, the terms "mounted," "supported," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

A film capacitor 100 according to embodiments of the present disclosure will be described with reference to drawings in the following.

Figure 2:
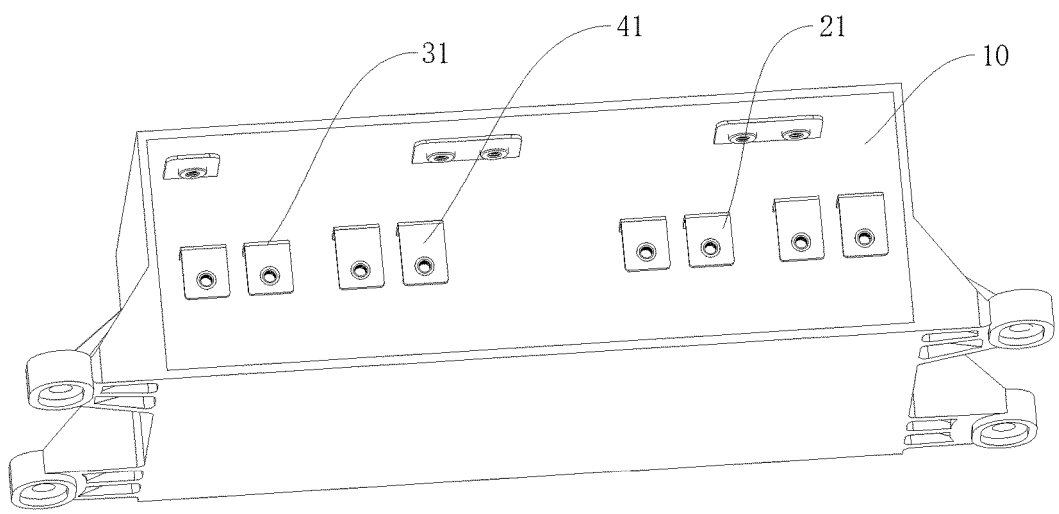
FIG. 2 is a schematic assembly view of a film capacitor according to an embodiment of the present disclosure.
Figure 3:
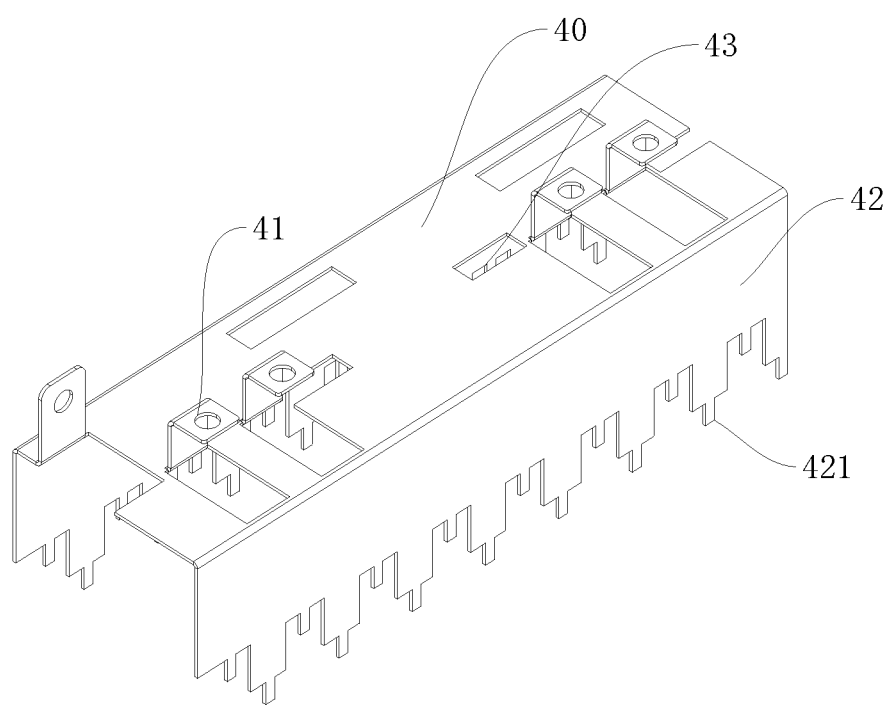
FIG. 3 is a schematic view of an intermediate busbar according to an embodiment of the present disclosure.

As shown in FIGS. 1 to 3, the film capacitor 100 according to embodiments of the present disclosure is a three-level film capacitor, which includes: a casing 10, a plurality of capacitor cores 60, a positive electrode busbar 20, a negative electrode busbar 30, an intermediate busbar 40, a first connection sheet 22 connected to the positive electrode busbar 20, a second connection sheet 32 connected to the negative electrode busbar 30, a third connection sheet connected to the intermediate busbar 40, a first electrode terminal 21 connected to the positive electrode busbar 20, a second electrode terminal 31 connected to the negative electrode busbar 30, and a third electrode terminal 41 connected to the intermediate busbar 40.

Specifically, the casing 10 has an open upper end, and the plurality of capacitor cores 60, the positive electrode busbar 20, the negative electrode busbar 30, the intermediate busbar 40, the first connection sheet 22, the second connection sheet 32, and the third connection sheet 42 are disposed within the casing 10 and sealed by potting insulators.

The plurality of capacitor cores 60 include a first group of capacitor cores 61 and a second group of capacitor cores 62. The first group of capacitor cores 61 is connected in parallel, and has a first end surface and a second end surface. The second group of capacitor cores 62 is connected in parallel, and has a third end surface and a fourth end surface. The second group of capacitor cores 62 is connected with the first group of capacitor cores 61 in series. The third end surface of the second group of capacitor cores 62 is opposite to the first end surface of the first group of capacitor cores 61.

Each capacitor core 60 has a positive electrode and a negative electrode. The positive electrodes of the first group of capacitor cores 61 are connected in parallel via the positive electrode busbar 20 and the first connection sheet 22 disposed on the first end surface. The negative electrodes of the second group of capacitor cores 62 are connected in parallel via the negative electrode busbar 30 and the second connection sheet 32 disposed on the third end surface. The negative electrodes of the first group of capacitor cores 61 are connected with the positive electrodes of the second group of capacitor cores 62 in series via the intermediate busbar 40 and the third connection sheet 42, in which the intermediate busbar 40 and the third connection sheet 42 are disposed on both the second end surface of first group of capacitor cores 61 and the fourth end surface of the second group of capacitor cores 62 respectively.

The intermediate busbar 40 is provided with a plurality of relief holes 43 configured to expose the first electrode terminal 21 and the second electrode terminal 31 therefrom. Thus the first electrode terminal 21 and the second electrode terminal 31 may pass through the relief holes 43 and may connect with external components. In some embodiments, the intermediate busbar 40 is connected with the two groups of capacitor cores at the open upper end of the casing 10, i.e., the two groups of capacitor cores are electrically connected with each other via the intermediate busbar 40, and the intermediate busbar 40 is located at the open upper end of the casing 10.

In other words, as shown in FIG. 1, the upper end of the casing 10 is opened and the casing 10 has a chamber therein. And, the plurality of capacitor cores 60, the positive electrode busbar 20, the negative electrode busbar 30, the intermediate busbar 40, the first connection sheet 22, the second connection sheet 32, and the third connection sheet 42 are disposed within the chamber and sealed by potting insulators.

The plurality of capacitor cores 60 include the first group of capacitor cores 61 and the second group of capacitor cores 62 in a front-rear direction. In some embodiments, a rear end surface (i.e. the first end surface) of the first group of capacitor cores 61 is opposite to a front end surface (i.e. the third end surface) of the second group of capacitor cores 62. The positive electrode busbar 20 is disposed on the rear end surface of the first group of capacitor cores 61. The positive electrode busbar 20 is provided with a plurality of the first connection sheets 22 connected in parallel, and each of the plurality of the first connection sheets 22 is connected to the rear end surface of the first group of capacitor cores 61 respectively.

The negative electrode busbar 30 is disposed on the front end surface of the second group of capacitor cores 62, and is insulated from the positive electrode busbar 20 via an insulation sheet 50. The negative electrode busbar 30 is provided with a plurality of the second connection sheets 32 connected in parallel, and each of the plurality of the second connection sheets 32 is connected to the front end surface of the second group of capacitor cores 62 respectively.

The intermediate busbar 40 is disposed above the plurality of capacitor cores 60. Each of front and rear side edges of the intermediate busbar 40 is provided with the third connection sheet 42 respectively.

In some embodiments, a plurality of the third connection sheets 42 are provided at the front side edge of the intermediate busbar 40, located between a front end surface (i.e. the second end surface) of the first group of capacitor cores 61 and a front wall of the casing 10, and connected with the front end surface of the first group of capacitor cores 61 respectively.

In some embodiments, a plurality of the third connection sheets 42 are provided at the rear side edge of the intermediate busbar 40, located between a rear end surface (i.e. the fourth end surface) of the second group of capacitor cores 62 and a rear wall of the casing 10, and connected with the rear end surface of the second group of capacitor cores 62 respectively.

Therefore, with the film capacitor 100 according to embodiments of the present disclosure, the plurality of the capacitor cores 60 are divided into two groups, and the capacitor cores in each group are connected in parallel via the positive electrode busbar 20 or the negative electrode busbar 30 respectively, and the two groups are connected in series with each other through the intermediate busbar 40 and the third connection sheet 42, the structure of the film capacitor 100 may be simplified, and the assembling may be convenient. Moreover, a plurality of capacitor cores 60 may be easily connected together in series, and the whole capacity of the film capacitor 100 may be improved. The above mentioned structure is suitable for three-level capacitor and has a wide application.

As shown in FIG. 3, in one embodiment, the intermediate busbar 40 is of a substantially inverted U shape, including a top portion and two free ends. The plurality of the third connection sheet 42 are provided with and integrally formed with the two free ends respectively, and the top portion covers above an upper surface of the plurality of capacitor cores 60.

That means, the third connection sheets 42 disposed at both the front and rear side edges of the intermediate busbar 40 are integrally formed with the intermediate busbar 40. The intermediate busbar 40 covers the upper surface of the plurality of capacitor cores 60 and seals the open upper end of the casing 10. The intermediate busbar 40 is provided with the third electrode terminal 41 and the plurality of relief holes 43 configured to expose the first electrode terminal 21 and the second electrode terminal 31 therefrom. Thus, the first electrode terminal 21 and the second electrode terminal 31 may pass through the relief holes 43 and may connect with external components, as shown in FIG. 3. Therefore, the intermediate busbar 40 has a reasonable structure, and is easy to mold and assemble, which may reduce the manufacturing costs.

The plurality of capacitor cores 60 may be arranged according to requirements of the three-level structure. Alternatively, as shown in FIG. 1, each group of the plurality of capacitor cores 60 (i.e. including the first group of capacitor cores 61 and the second group of capacitor cores 62) is arranged in a plurality of rows and at least one layer. In some embodiments, the plurality of capacitor cores 60 are arranged in two groups, i.e. the first group of capacitor cores 61 and the second group of capacitor cores 62, each group of the plurality of capacitor cores 60 are arranged in the plurality of rows and two layers. Therefore, the plurality of capacitor cores 60 have a reasonable structure and are easy to assemble, and the whole capacity of the thin-film capacitor 100 is further improved.

In some embodiments, the first connection sheet 22 is provided with a first connection terminal 221 at a peripheral edge thereof, the second connection sheet 32 is provided with a second connection terminal at a peripheral edge thereof, and the third connection sheet 42 is provided with a third connection terminal 421 at a peripheral edge thereof. Preferably, a plurality of the first connection terminals 221 are provided, disposed at the peripheral edge of the first connection sheet 22 and spaced apart from each other. A plurality of the second connection terminals are provided, disposed at the peripheral edge of the second connection sheet 32 and spaced apart from each other. A plurality of the third connection terminals 421 are provided, disposed at the peripheral edge of the third connection sheet 42 and spaced apart from each other.

In other words, the plurality of the first connection terminals 221 are disposed on the peripheral edge of the first connection sheet 22, the plurality of the second connection terminals are disposed on the peripheral edge of the second connection sheet 32, and the plurality of the third connection terminals 421 are disposed on the peripheral edge of the third connection sheet 42. The first connection sheet 22, the second connection sheet 32 and the third connection sheet 42 may be connected to corresponding capacitor cores 60 through respective connection terminals in a welding manner, which is convenient for the welding automation, and effectively improves the product quality and the assembling efficiency.

In some embodiments, the first connection terminal 221 and the first connection sheet 22 are integrally formed, the second connection terminal and the second connection sheet 32 are integrally formed, and the third connection terminal 421 and the third connection sheet 42 are integrally formed. In some embodiments, the first connection sheet 22 and the positive electrode busbar 20 are integrally formed, the second connection sheet 32 and the negative electrode busbar 30 are integrally formed, and the third connection sheet 42 and the intermediate busbar 40 are integrally formed.

In other words, according to an embodiment of the present disclosure, the first connection sheet 22, the first connection terminal 221 and the positive electrode busbar 20 are integrally formed; the second connection sheet 32, the second connection terminal and the negative electrode busbar 30 are integrally formed; the third connection sheet 42, the third connection terminal 421 and the intermediate busbar 40 are integrally formed. Thus, this structure ensures the stability of the whole structure of the film capacitor 100 and is easy to mold and assemble which further reduces the manufacturing cost and improves the assembling efficiency at the same time.

Other structures and operations of the film capacitor 100 according to embodiments of the present disclosure are known to those skilled in the art, and thus will not be described in detail here.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A film capacitor, comprising:
   a plurality of capacitor cores, comprising:
     a first group of capacitor cores connected in parallel, having a first end surface and a second end surface; and
     a second group of capacitor cores connected in parallel, connected with the first group of capacitor cores in series, having a third end surface opposite to the first end surface of the first group of capacitor cores and a fourth end surface;
   a positive electrode busbar, connected to the first end surface of the first group of capacitor cores;
   a negative electrode busbar, connected to the third end surface of the second group of capacitor cores;
   an intermediate busbar, connected to the second end surface of the first group of capacitor cores and the fourth end surface of the second group of capacitor cores respectively;
   a first connection sheet connected to the positive electrode busbar;
   a second connection sheet connected to the negative electrode busbar; and
   a third connection sheet connected to the intermediate busbar.

2. The film capacitor according to claim 1, further comprising a casing, wherein the plurality of capacitor cores, the positive electrode busbar, the negative electrode busbar, the intermediate busbar, the first connection sheet, the second connection sheet and the third connection sheet are disposed within the casing and sealed by potting one or more insulators.

3. The film capacitor according to claim 1, further comprising an insulation sheet located between the positive electrode busbar and the negative electrode busbar.

4. The film capacitor according to claim 1, wherein the intermediate busbar is of a substantially inverted U shape and comprises:
   two free ends, each of the two free ends provided with and integrally formed with the third connection sheet; and
   a top portion, covering above an upper surface of the plurality of capacitor cores.

5. The film capacitor according to claim 1, wherein each of the first and second groups of capacitor cores is arranged in a plurality of rows and in no less than one layer.

6. The film capacitor according to claim 5, wherein each of the first and second groups of capacitor cores is arranged in the plurality of rows and in two layers.

7. The film capacitor according to claim 1, wherein the first connection sheet is provided with a first connection terminal at a peripheral edge thereof;
   the second connection sheet is provided with a second connection terminal at a peripheral edge thereof; and
   the third connection sheet is provided with a third connection terminal at a peripheral edge thereof.

8. The film capacitor according to claim 7, wherein the first connection terminal and the first connection sheet are integrally formed;
   the second connection terminal and the second connection sheet are integrally formed; and
   the third connection terminal and the third connection sheet are integrally formed.

9. The film capacitor according to claim 1, wherein the first connection sheet and the positive electrode busbar are integrally formed;
   the second connection sheet and the negative electrode busbar are integrally formed; and
   the third connection sheet and the intermediate busbar are integrally formed.

10. A film capacitor, comprising:
    a plurality of capacitor cores, comprising:
      a first group of capacitor cores connected in parallel, having a first end surface and a second end surface; and
      a second group of capacitor cores connected in parallel, connected with the first group of capacitor cores in series, having a third end surface opposite to the first end surface of the first group of capacitor cores and a fourth end surface;
    a positive electrode busbar, connected to the first end surface of the first group of capacitor cores;
    a negative electrode busbar, connected to the third end surface of the second group of capacitor cores; and
    an intermediate busbar, connected to the second end surface of the first group of capacitor cores and the fourth end surface of the second group of capacitor cores respectively.

11. The film capacitor according to claim 10, further comprising:
    a first connection sheet and a first electrode terminal connected to the positive electrode busbar;
    a second connection sheet and a second electrode terminal connected to the negative electrode busbar; and
    a third connection sheet and a third electrode terminal connected to the intermediate busbar.

12. The film capacitor according to claim 11, wherein the intermediate busbar is provided with a plurality of relief holes configured to expose the first electrode terminal and the second electrode terminal therefrom.

13. The film capacitor according to claim 11, further comprising a casing, wherein the plurality of capacitor cores, the positive electrode busbar, the negative electrode busbar, the intermediate busbar, the first connection sheet, the second connection sheet and the third connection sheet are disposed within the casing and sealed by potting one or more insulators.

14. The film capacitor according to claim 11, wherein the first connection sheet is provided with a first connection terminal at a peripheral edge thereof;
    the second connection sheet is provided with a second connection terminal at a peripheral edge thereof; and
    the third connection sheet is provided with a third connection terminal at a peripheral edge thereof.

15. The film capacitor according to claim 14, wherein the first connection terminal the first connection sheet and the positive electrode busbar are integrally formed;
    the second connection terminal, the second connection sheet and the negative electrode busbar are integrally formed; and
    the third connection terminal, the third connection sheet and the intermediate busbar are integrally formed.

16. The film capacitor according to claim 10, further comprising an insulation sheet located between the positive electrode busbar and the negative electrode busbar.

17. The film capacitor according to claim 10, wherein the intermediate busbar is of a substantially inverted U shape and comprises:
   two free ends, each of the two free ends provided with and integrally formed with the third connection sheet; and
   a top portion, covering above an upper surface of the plurality of capacitor cores.

18. The film capacitor according to claim 10, wherein each of the first and second groups of capacitor cores is arranged in a plurality of rows and in no less than one layer.

* * * * *